United States Patent [19]

Graham

[11] 4,095,562
[45] Jun. 20, 1978

[54] ANIMAL REFUSE CONTAINER

[76] Inventor: Tessie Graham, 5477 S. Drexel, Chicago, Ill. 60615

[21] Appl. No.: 702,718

[22] Filed: Jul. 6, 1976

[51] Int. Cl.² .............................................. A01K 23/00
[52] U.S. Cl. ..................................................... 119/95
[58] Field of Search ...................... 119/95, 143; 54/79

[56] References Cited

U.S. PATENT DOCUMENTS

| 2,173,356 | 9/1939 | Cross | 119/95 |
|---|---|---|---|
| 2,585,251 | 2/1952 | Kahlert | 119/95 |
| 3,141,443 | 7/1964 | Huey | 119/143 |
| 3,211,132 | 10/1965 | Hersh | 119/143 |
| 3,792,687 | 2/1974 | Ehrman | 119/95 |

Primary Examiner—Hugh R. Chamblee
Attorney, Agent, or Firm—Anthony S. Zummer

[57] ABSTRACT

An animal refuse container is herein disclosed. The animal refuse container includes a jacket. A refuse receptacle is releasably connected to the jacket. The refuse receptacle is surrounded by a receptacle cover. The receptacle is wrapped around an abdominal portion and hindquarters portion of an animal with the refuse receptacle positioned under a pair of termini of an anal and an urinary tract of the animal.

3 Claims, 5 Drawing Figures

U.S. Patent June 20, 1978 4,095,562
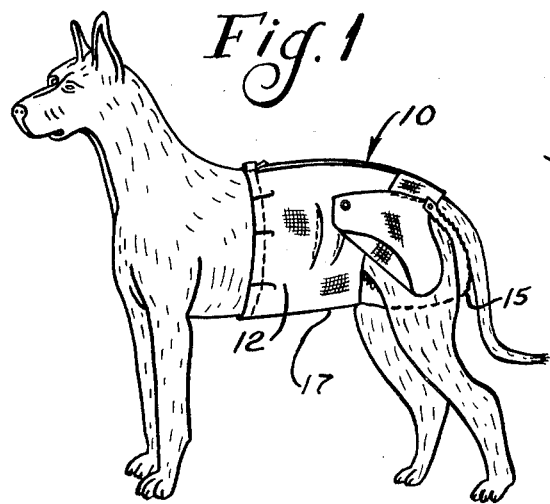
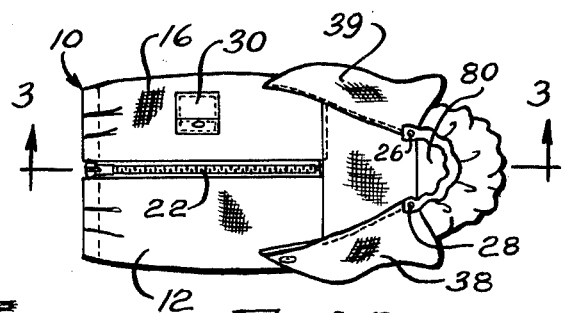
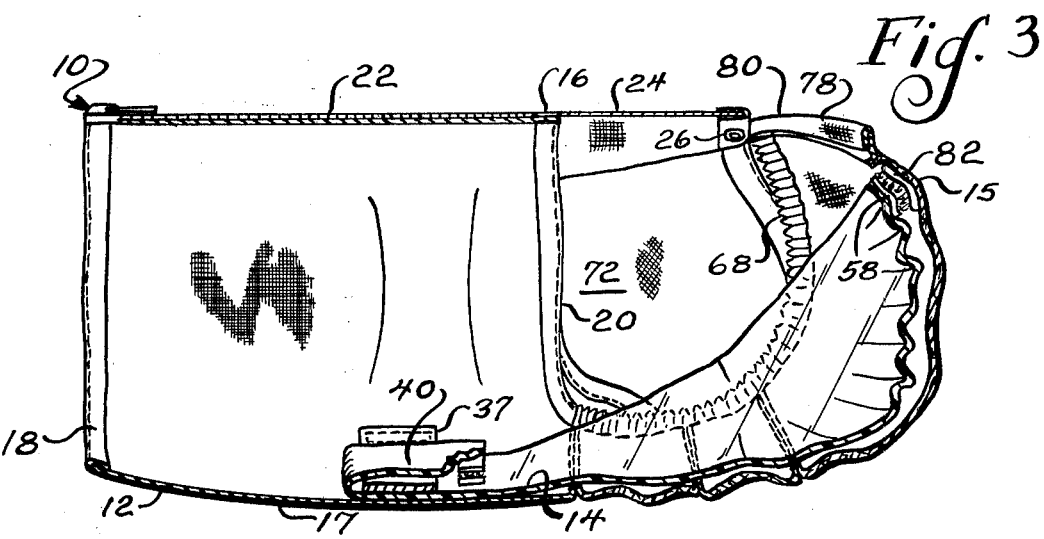
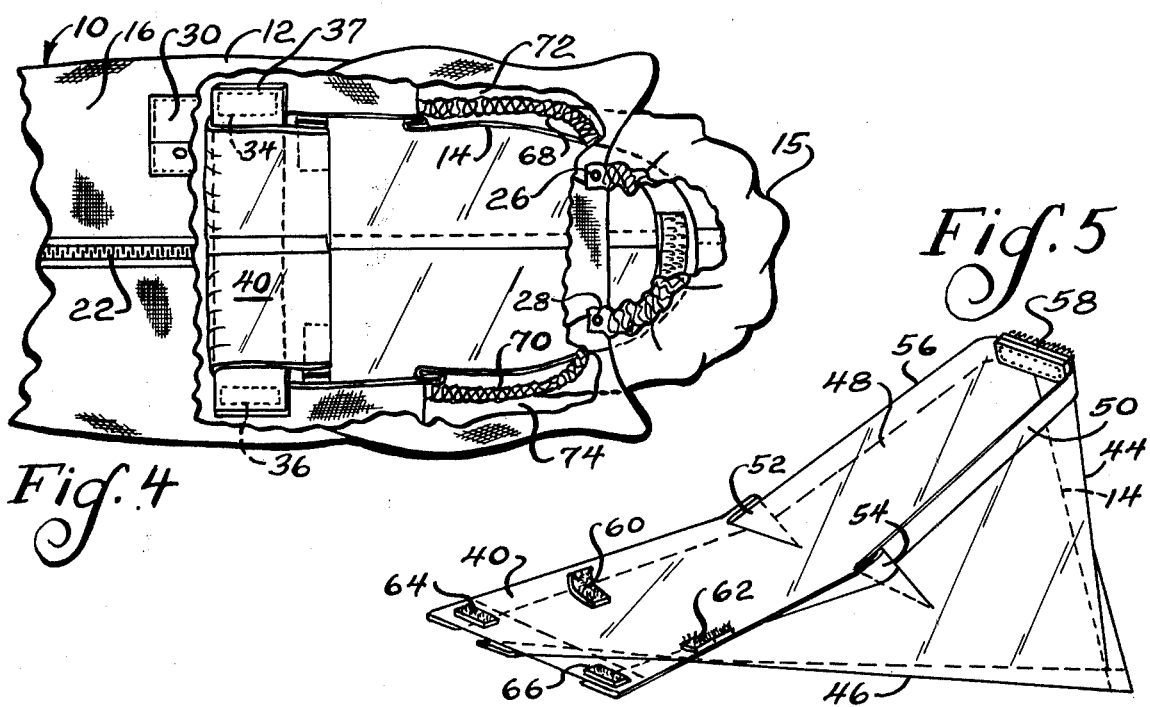

ANIMAL REFUSE CONTAINER

BACKGROUND OF THE INVENTION

The problem of pet waste control in the large cities is becoming particularly acute. Canine waste deposited on lawns of homes, in parks and on sidewalks is both unsightly and unhealthy. In the past, proposals have been made that dog owners carry devices for scooping up and removing the dog waste from the surface on which it falls. The problem with most of these devices is that they are fairly large and the dog owner does not wish to carry the device with him when he is walking the dog. In addition, some dogs are allowed to run loose so that no dog owner is with them to clean up after them. Oftentimes pet owners wish to prevent their pets from soiling furniture or carpeting while the pets are indoors. At the present time, if the pet is not housebroken, this is often difficult.

Therefore, what is needed, is a canine refuse container which the dog carries himself. The canine waste container should be light and easy to place on the dog for wearing. At the same time, the container should present a minimum of interference with the animal's natural movement. The refuse container should also be disposable or have a disposable portion to promote hygiene.

SUMMARY OF THE INVENTION

An animal refuse container is herein disclosed. The animal refuse container includes a substantially cylindrical jacket, having a zipper closure. The substantially cylindrical jacket is connected to a flexible disposable receptacle. The flexible disposable receptacle is approximately pyramidal in shape. A receptacle cover is connected to the substantially cylindrical jacket adjacent the flexible disposable receptacle and surrounds the flexible disposable receptacle.

In use, the substantially cylindrical jacket is positioned snugly around a torso of an animal. The flexible disposable receptacle and receptacle cover are positioned between a pair of hindquarters of the animal and connected to the flexible cylindrical jacket at a back portion. Thus, the flexible disposable receptacle is positioned below a urinary and an anal termini of the animal to receive waste material from the animal. The animal is then exercised while wearing the animal refuse container. After the animal has urinated or defecated, the jacket is removed from the animal and the flexible disposable receptacle is removed from the jacket, thrown away and a new flexible disposable receptacle replaced in its stead.

It is therefore, a principal object of the present invention to provide an animal refuse container which can be worn by an animal without impeding the animal's natural movement.

It is another object of the present invention to provide an animal refuse container for use as a housebreaking aid for young dogs.

It is another object of the instant invention to provide an animal refuse container having a disposable receptacle portion which may be quickly and easily replaced.

It is a still further object of the present invention to provide an animal refuse container which is economical, aesthetically pleasing, and simple to use.

BRIEF DESCRIPTION OF THE DRAWING

FIG. 1 is a perspective view of a dog wearing an animal refuse container embodying the instant invention, portions of the animal refuse container being shown in phantom view;

FIG. 2 is a top view of the animal refuse container of FIG. 1;

FIG. 3 is a view taken along line 3—3 of FIG. 2 of the animal refuse container;

FIG. 4 is a top view of a portion of the animal refuse container shown in FIG. 2, with portions broken away showing details of the attachment of a flexible disposable receptacle to other portions of the animal refuse container; and FIG. 5 is a perspective view of the flexible disposable receptacle.

DESCRIPTION OF THE PREFERRED EMBODIMENT

Referring now to the drawing, and especially to FIGS. 1, 3 and 4, an animal refuse container generally indicated by numeral 10 and embodying the instant invention is shown therein. Animal refuse container 10 has a substantially cylindrical jacket 12. Substantially cylindrical jacket 12 has a flexible disposable receptacle 14 connected to it. A receptacle cover 15 is connected to the substantially cylindrical jacket 12 and substantially covers flexible disposable receptacle 14.

Substantially cylindrical jacket 12 has approximately the same diameter as a thoracic section of an animal which is to wear the animal refuse container. Jacket 12 has a top portion 16 and a floor portion 17. Substantially cylindrical jacket 12 has a front hemline 18. Substantially cylindrical jacket 12 terminates in a pair of rear hemlines, one of which is shown as hemline 20. A zipper 22 connects top portion 16 of the jacket 12 together. Zipper 22 terminates adjacent hemlines 18 and 20. A tail flap 24 is connected to top portion 16 of cylindrical jacket 12 adjacent hemline 20. Tail flap 24 includes a pair of snap fasteners 26 and 28. A small square pocket of the nature of a watch pocket 30 is sewn into jacket 12, adjacent zipper 22. Floor portion 17 has a pair of stitch lines, respectively numbered 34 and 36 attached thereto. Stitch lines 34 and 36 hold a receptacle loop 37 in contact with floor 17. A pair of shank flaps, respectively numbered 38 and 39 is connected to jacket 12 adjacent hemline 20. Shank flaps 38 and 39 cover a pair of hind legs of the animal. Cylindrical jacket 12 is composed of denim in this embodiment, but may be composed of other flexible materials.

Receptacle loop 37 receives a tongue portion 40 of receptacle 14. Receptacle 14 is shaped approximately pyramidally, having a back wall 44, a bottom wall 46, formed integral with back wall 44, a first pleated side wall 48 formed integral with back wall 44 and bottom wall 46 and a second pleated side wall 50 formed integral with back wall 44 and bottom wall 46. Side wall 48 has a pleat 52. Side wall 50 has a pleat 54. A reinforcing hem 56 is formed integral with walls 44, 46, 48 and 50. A loop type fastener 58 is connected to back wall 44 adjacent hem 50. A first pair of loop type fastener pads, respectively numbered 60 and 62, is connected to bottom wall 46 adjacent hem 50. A second pair of mating loop fastener pads, respectively numbered 64 and 66, is also connected adjacent hem 50 to bottom wall 46 at tongue extension 40. Receptacle 14 is composed of a clear polyethylene plastic and is easily disposable. Receptacle 14 is connected to loop 37 by passing tongue 40 between loop 37 and floor 17 so that loop 37 is positioned between fastener pads 60 and 62 and fastener pads 64 and 66, respectively. Fastener pad 64 is then pressed into contact with fastener pad 60 and fastener pad 66 is pressed into contact with fastener pad 62 to hold disposable receptacle 14 in connection with loop 37 of jacket 12.

Receptacle cover 15 is a "C" shaped receptacle cover. Receptacle cover 15 is joined to jacket 12 adjacent hem 20. Receptacle cover 15 has a pair of elastic side bands, respectively numbered 68 and 70. Bands 68 and 70 together with the rear hems of the jacket, define a pair of leg apertures numbered respectively, 72 and 74. Hems 68 and 70 terminate in a hem loop 78. Hem loop 78, together with back flap 24, defines a tail aperture 80. Receptacle cover 15 includes a fastener tab 82 positioned adjacent aperture 80. Hook type fastener tab 82 connects to fastener tab 58 of disposable receptacle 14. Receptacle cover 15 substantially covers disposable receptacle 14 with the exception of a small part of hem 56 adjacent pleats 52 and 54.

In use, the animal refuse container is unzipped along zipper 22 and snaps 26 and 28 are unsnapped, thereby allowing flap 24, which is only connected to one side of jacket 12, to be swung away from zipper 22. The animal refuse container is then lifted around the animal and zipper 22 is placed immediately adjacent a spinal column of the animal. Zipper 22 is then zipped closed and disposable receptacle 14, together with receptacle cover 15, is pulled between the animal's hind legs and snapped to flap 24 at snaps 26 and 28. The animal's tail passes through tail aperture 80 formed by receptacle cover 15 and flap 24. Receptacle 14 is thus positioned immediately below a terminus of a urinary tract and an anus of the animal. The animal is then exercised and urine or fecal matter from the animal drops into disposable receptacle 14.

After the animal's exercise, the animal refuse container is removed from the animal by unsnapping snaps 26 and 28, unzipping zipper 22 and dropping the refuse container away from the animal's body. The receptacle 14 is then removed from jacket 12 and receptacle cover 15 by releasing fasteners 60 and 64, 62 and 66 and sliding tongue 40 out from under loop 37. Fasteners 58 and 82 are then pulled apart and receptacle 14 is lifted free of receptacle cover 15. Receptacle 14 and its contents are then disposed of.

A fresh receptacle 14 is then connected to jacket 12 by sliding tongue 40 under loop 37 and closing fasteners 60 and 64 and 62 and 66. Fasteners 58 and 82 are then connected together to join wall 44 to receptacle cover 15. Receptacle cover 15 is made of an opaque cloth material for aesthetic reasons.

It may be appreciated that the instant invention has several advantages. The instant invention provides a refuse container to receive urine or fecal matter from a dog or other animal while the dog is being exercised. Thus, the animal may be exercised out doors without soiling or damaging the property of other persons. The refuse container can also be used indoors for a dog or other animal in several ways. The refuse container can be used with a female dog in oestrous. The refuse container is worn in order to prevent spotting of carpeting or furniture and any discharge from the female dog is received by receptacle 14. The discharge is not absorbed into the receptacle 14 and receptacle 14 can be quickly and easily changed. The refuse container can also be used as a housebreaking device for animals to prevent animals from having accidents within the confines of a house. It may be appreciated that the refuse container, therefore, can protect carpeting and furniture from puppy accidents before the animal is housebroken.

Although a specific embodiment of the instant invention has been described in detail above, it may be appreciated that one skilled in the art may make various modifications and changes in the disclosure without departing from the spirit and scope of the instant invention. The invention is therefore, only limited by the appended claims.

What is claimed is:

1. An animal refuse container comprising: a substantially cylindrical jacket adapted to be positioned about a torso of an animal, said substantially cylindrical jacket having a jacket loop mounted interiorly of said cylindrical jacket along a bottom portion thereof; a flexible disposable receptacle composed of a clear plastic pyramid releasably connected to said jacket loop of the substantially cylindrical jacket, said flexible disposable receptacle having a plurality of walls, each of said walls having a free edge, said flexible disposable receptacle terminating at an apex opposite said free edges, said free edges being adapted for substantially complete contact with said torso of said animal along a perimeter surrounding a pair of termini of an alimentary canal and a urinary system of the animal respectively, said contact between said free edges of said flexible disposable receptacle and said torso of said animal preventing release of an animal waste from said flexible disposable receptacle, said apex being adapted to be moved away from said free edges when animal waste is present in said flexible disposable receptacle to prevent release of said animal waste; and a receptacle cover releasably connected to said cylindrical jacket at an upper rear portion of said cylindrical jacket, said receptacle cover also being connected to said bottom portion of said cylindrical jacket, said receptacle cover being releasably connected to said flexible disposable receptacle opposite said jacket loop to hold said edges of said flexible disposable receptacle in tension against said animal, said receptacle cover being positioned exterior to and contiguous with a portion of the flexible disposable receptacle, said receptacle cover substantially covering said flexible disposable receptacle.

2. An animal refuse container as defined in claim 1, in which said flexible disposable receptacle includes a tongue portion which releasably engages the jacket loop connected to said substantially cylindrical jacket.

3. An animal refuse container comprising: a substantially cylindrical cloth jacket having a zipper connected thereto, said zipper closing said substantially cylindrical cloth jacket around a torso of an animal, a jacket loop mounted interiorly of said substantially cylindrical jacket along a bottom portion thereof; a flexible disposable clear plastic pyramidal receptacle releasably connected to said jacket loop along a tongue portion thereof, said flexible disposable clear plastic pyramidal receptacle having a first plurality of releasable loop fasteners connected to said tongue portion of said flexible disposable clear plastic pyramidal receptacle, said tongue portion releasably engaging said jacket loop, said clear plastic flexible disposable pyramidal receptacle having a plurality of walls, each wall of said plurality having a free edge, said free edges being adapted for substantially complete contact with said torso of said animal along a perimeter surrounding a pair of termini of an alimentary canal and a urinary system of the animal respectively, said free edges preventing release of an animal waste from said clear plastic pyramidal flexible disposable receptacle, said clear plastic pyramidal flexible disposable receptacle having an apex positioned opposite said free edges, said apex being adapted to move away from said free edges when animal waste is present in said flexible disposable clear plastic pyramidal receptacle to prevent release of said animal waste; and a cloth receptacle cover, said cloth receptacle cover being releasably connected to said substantially cylindrical cloth jacket adjacent said zipper, said cloth receptacle cover also being connected to said bottom portion of said substantially cylindrical cloth jacket, said cloth receptacle cover being releasably connected to said clear plastic pyramidal flexible disposable receptacle at a second releasable loop fastener opposite said tongue portion to hold said free edges of said clear plastic pyramidal flexible disposable receptacle in tension against said torso of said animal, said cloth receptacle cover being opaque, said cloth receptacle cover substantially covering said flexible disposable clear plastic pyramidal receptacle and being positioned exterior thereto and contiguous therewith.

* * * * *